United States Patent [19]

Schortmann et al.

[11] Patent Number: 4,537,819
[45] Date of Patent: Aug. 27, 1985

[54] SCRUB-WIPE FABRIC

[75] Inventors: Walter E. Schortmann, West Hartford, Conn.; Dennis Metrick, Natick, Mass.

[73] Assignee: The Kendall Company, Boston, Mass.

[21] Appl. No.: 678,303

[22] Filed: Dec. 5, 1984

[51] Int. Cl.³ ............................................. D04N 1/46
[52] U.S. Cl. .................. 428/284; 15/209 R; 28/104; 428/221; 428/311.1; 428/316.6; 428/317.9
[58] Field of Search ............ 428/284, 286, 299, 311.1, 428/311.5, 316.6, 317.9, 221; 28/104, 105; 15/209 R

[56] References Cited

U.S. PATENT DOCUMENTS 3,441,464 4/1969 Blue ..................................... 428/221
3,532,588 9/1970 Newman .............................. 428/221

Primary Examiner—James J. Bell

[57] ABSTRACT

A non-woven fabric is formed from a reticulated foam combined with at least one layer of a nonwoven web. This unbonded composite fabric is then entangled together by passing it under jets of water, which are under high pressure. The resulting fabric structure has stiff foam protrusions, exiting the nonwoven fabric to function as bristles.

11 Claims, 5 Drawing Figures

A-A

SCRUB-WIPE FABRIC

BACKGROUND OF INVENTION

A major problem exists today in the cleaning of modern kitchen/bathroom floors that are covered with the so-called "no-wax" urethane materials. Nearly all these urethane materials are heavily embossed and ordinary cleaning materials and/or applicators do not adequately remove soil from the embossed grooves that are present in the floor covering. Furthermore, the flat surfaces on the floor covering are difficult to clean well enough to restore them to their original lustre. Accordingly, a better cleaning product is needed.

The present invention provides such a product since it has the capability to scrub and clean the grooves as well as the flat sections of the embossed flooring in a manner far more effectively and conveniently than any prior art fabrics presently available.

The preferred embodiment of the present invention consists of a reticulated foam inserted between layers of nonwoven webs and the composite is entangled together by jets of high pressure fluid. This results in a fabric that has foam bristles protruding through it, which allows the fabric to not only clean a flat surface but to scrub within the grooves of the floor covering as well.

In U.S. Pat. No. 3,707,012, there is disclosed a scrub brush made of chemical foam having its own soap supply, which is used in surgical, cosmetics and industrial applications. A disadvantage to this particular type brush is that it is made totally out of foam, therefore having substantial body or stiffness. One other disadvantage is that this prior art brush, being made solely out of foam, will tend to disintegrate when used as a scrub brush for any length of time, because the structure of foam is inherently weak and cannot withstand the abrasion usually encountered in cleaning. Furthermore, the brushes are of a specific geometry, therefore have a minimum available surface area in comparision to a fabric.

In U.S. Pat. No. 3,611,468, there is disclosed a scrub brush comprised of two sections of foam, each having different hardnesses. One section being of relatively soft foam and the other section of substantially harder foam that is sufficiently stiff to carry out the scrubbing required of it. This approach would have the same disadvantages as the aforementioned prior art.

Other prior art relating to the present invention are U.S. Pat. Nos. 3,532,588 and 3,441,464. These patents use needle punching to insert a material into a foam base. Disadvantages of this prior art are obvious. Using a needle loom to punch material into foam is a very slow and expensive process. The resulting materials are also different than the present art because soft or flexible fibers are needle punched into the foam. The end result being that a portion of the soft or flexible fibers remain on the surface resulting in a soft surface. This type of material could possibly be used for cleaning purposes, such as wiping a surface, but would not be appropriate for scrubbing because of the soft fibers that extend out of the fabric. Another disadvantage of the aforementioned prior art is that heat is applied, to at least one surface of the prior art fabrics, which bonds the foam and fibers together, thus creating a fabric that is then stiff and not flexible.

The prior art has tried to provide a composite scrub brush that could both clean and scrub, but has not done so prior to this invention. However, this invention allows the foam to protrude out of the material to act as bristles which actually do the scubbing, while the remaining nonwoven material does the cleaning. Although the bristles are firm enough to scrub surfaces, they do not scratch ordinary surfaces, such as floor coverings, pots and pans, dishes, etc.. In addition, because hydrophilic fibers are used in the fabric the fibers may also absorb fluids that may be present in the cleaning procedure.

SUMMARY

The present invention relates to a nonwoven fabric particularly well suited for use as a floor cleaning fabric. This fabric is a composite comprising a relatively stiff low density reticulated foam inserted between layers of a blend of rayon and polyester nonwoven web, with the unbonded composite then being entangled by passing it under jets of water, which are under high pressure, creating a structure having stiff protrusions. These protrusions are created when the foam, which is made up of a majority of connecting polymer circles therein, has these circles substantially broken up by the water jets. This breaking up of the polymer circles makes the foam discontinuous and causes it to protrude through the fabric to function as bristles.

An object of this invention is to provide a fabric with protruding bristles to scrub and clean irregular, as well as flat, surface areas.

Another object of this invention is to provide a nonwoven fabric that is capable of absorbing liquids and entrapping dirt in said liquid within the interior of the fabric.

Still another object of this invention is to provide a nonwoven fabric strong enough to take abuse of most cleaning forces without abrading.

A further object of this invention is to provide a fabric that has a flexible structure so it may be used to clean in difficult places such as corners or grooves.

Another object of this invention is to provide a fabric that has a surface that will not scratch ordinary surfaces.

DESCRIPTION OF THE PREFERRED EMBODIMENT

The present invention is a composite fabric used primarily for the cleaning of floors that has a cloth-like appearance and a non-geometric shape. A non-geometric shape for the purpose of this application may be defined as a completely deformable material because of its cloth-like nature. This non-geometric shape, thus, gives further flexibility to the fabric enabling it to clean places not easily reached by other methods of cleaning. Although the present invention is better suited for use as a floor cleaner, it may also be used as a fabric for cleaning pots and pans, dishes, jewelry (e.g. rings), fingernails, certain areas of animal skin, white-wall tires and other typical uses where there is a need for a scrub fabric that will not scratch ordinary surfaces. The present invention fabric does not scratch ordinary surfaces, because the foam, which is a plastic polymeric foam, has no inherent abrasive properties toward ordinary surfaces and because the fiber used is made from essentially soft materials, such as cotton, rayon, etc..

The present invention is a strong non-woven material having integral, firm protrusions, which emanate predominately from one side of the fabric and function as bristles for scrubbing purposes. The nonwoven web structure and its inner foam core serves as an absorber of cleaning solutions to further aid in the floor cleaning process. The present invention not only can wipe a surface and absorb liquid, but it is designed to scrub a floor clean while entrapping, within the fabric, dirt that is being scrubbed off the floor. This entrapment of dirt into the fabric is due basically to the open structure of the nonwoven, which allows the dirt to enter the fabric and, the hydrophillic nature of the foam and fibers used in the fabric, which absorbs liquid that has dirt within it. In the cleaning of floors and the like, dirt that is emulsified by the use of detergents enters the fabric by an absorbtion process, caused by the hydrophillic nature of the fibers, and is retained therein. With the fabric entrapping dirt therein abrasion of a surface, that may take place when wiping the dirt off a surface, is eliminated.

Figure 1:
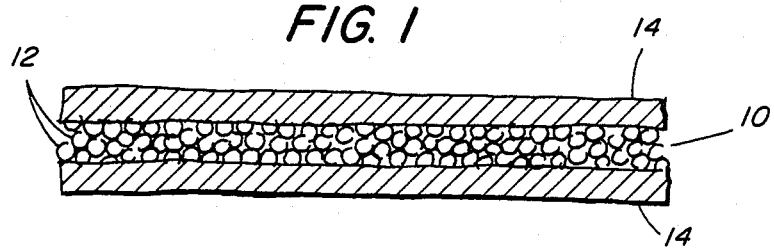
FIG. 1 is a cross-sectional view of the preferred embodiment to show the layers of nonwoven web with the reticulated foam inserted between the webs before entangling the composite.
Figure 3:
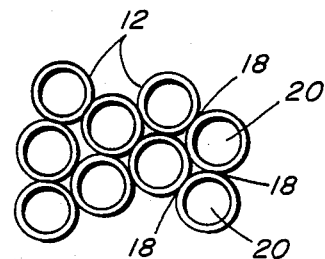
FIG. 3 is a view illustrating the pores of the foam and the polymer surrounding the pores.

To illustrate the preferred embodiment, reference is made to FIG. 1 which shows the fabric 10 with the reticulated stiff low density polymeric foam 12 inserted between the layers of a nonwoven web 14 prior to any entangling process. Reticulated foam, for the purpose of this application, means the open pores in the foam resulting from either thermal or caustic treatment which methods give a constant 97% void volume or openness, as it is commonly referred to, of the pores within the foam. As illustrated in FIG. 3, a reticulated foam 12, made from polymers, having pores 20, with circles of polymer 22 therearound, has interconnecting polymeric bridges 18, surrounding the pores. Although 97% void volume/openness of the pores in the foam is preferred, any reticulated foam having at least 70% void volume may be used. Although the density of the foam may range between 1.50 to 3.0 pounds per cubic foot, the preferred foam has a density of 1.75 pounds per foot.

Figure 2:
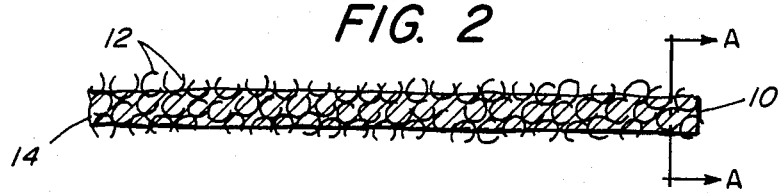
FIG. 2 is a cross-sectional view of the preferred embodiment to show the fabric after entanglement of the webs and reticulated foam has taken place.
Figure 4:
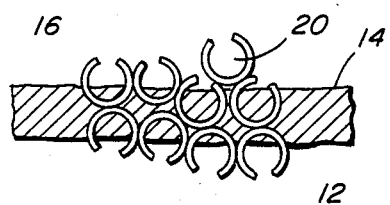
FIG. 4 is a cross-sectional view of FIG. 2 showing the bridges and the unconnected ends of the foam after entanglement.
Figure 5:
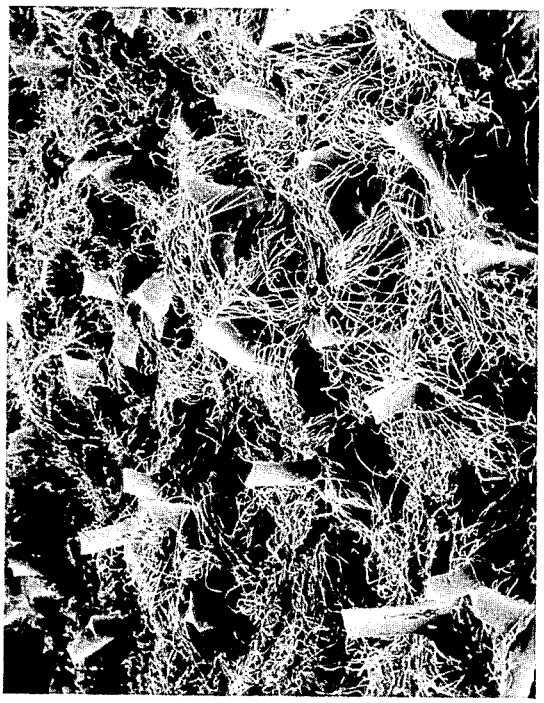
FIG. 5 is a photomicrograph of the present invention to show more clearly the foam structure protruding through the fabric.

To further illustrate the present invention, reference is made to FIG. 2, which shows the fabric 10, after hydroentangling of the web 14 and the reticulated foam 12 has been completed. The entangling is done by passing the composite fabric of foam and webs or web under jets of high pressure water. These jets of water not only entangle the foam and web, but also push the web 14 down into the foam 12, as illustrated in FIGS. 4 and 5, and to some degree breaks up the outer circles of polymer 22, as shown in FIG. 3, of the foam into discontinuous foam having unconnected ends 16, as shown in FIGS. 4 and 5. This takes place while the inner circles of polymer 24, also shown in FIG. 4 remain substantially interconnected. It should be noted that the outer unconnected ends of the foam are not loose pieces of polymer. These unconnected ends remain after a section is broken from outer circles of polymer. These ends also remain connected to the inner circles of polymer by bridges 18, as shown in FIGS. 4 and 5. Discontinuous foam is defined for the purpose of this specification, as foam physically separated from other portions of foam. Because the web is pushed into the foam by the water jets, it becomes compacted in the foam. As illustrated in FIGS. 4 and 5, this leaves part of the foam 12, more specifically, the polymeric outer unconnected ends 16 of the foam, above the surface of the fabric 10. FIG. 5 further illustrates the fabric 10 after it has been passed between rolls, under pressure, which further breaks up the outer circles of polymer 22 in the foam 12. This breaking up of the outer circles of polymer, by the water jets and the rolls, into discontinous foam having unconnected ends, creates bristles or protrusions 26, as shown in FIGS. 4 and 5, which now protrude above the surface of the fabric 10.

The preferred embodiment of this invention is made, as is illustrated in FIG. 1, by inserting a continuous sheet of reticulated, relatively stiff low density foam 12, which may range from 30 to 150 grams per square yard in weight, between two carded nonwoven webs 14 of natural or synthetic staple fibers. At this time it should be pointed out that the word "stiff" does not suggest that the fabric is stiff per se, but only that stiffness is a function of the high modulus polymer used in the foam. In fact, the bristles are soft enough to be non-scratching as mentioned in an earlier paragraph.

Once the foam is made discontinuous, the fabric takes on its non-geometric shape. Although the use of two nonwoven webs is preferred, the reticulated foam may be physically entangled to a single nonwoven web, with slightly less desirable results. The total weight of the nonwoven webs may be chosen as desired for a given application from at least a weight of 20 grams per square yard (gsy) upwards to a practical limit of about 100 gsy. The webs used usually consist of hydrophilic staple fibers of rayon, cotton, polyester, or polyolefins, which have been made hydrophilic, or mixtures thereof of any staple fiber. Different fibers may be used to tailor-make the fibrous nonwoven web according to strength, absorptivity, bulk or other required product qualities. A reticulated foam such as Scott Industrial Foam manufactured by Scott Paper Company Foam Division, located in Chester, Pa., may be used and should be at least one sixteenth of an inch (1/16) in thickness depending on the product requirements.

As illustrated in FIG. 1, the location of the foam 12 within a multiple layered web 14 is limited in the preferred embodiment only by the need of the foam 12 to be close enough to at least one surface of the fabric 10 for the unconnected ends of the foam, or preferrably referred to, as bristles, to penetrate through the surface of the fabric and to protrude therefrom. The bristles produced provide the present invention with the capability to scrub and clean irregular as well as flat surfaces. The bristles of this invention act in a fashion that is similar to the bristles on a wooden scrub brush, which will enter depressions in embossed surfaces, while also cleaning flat surfaces. The advantages of the present invention are very clear. This fabric not only can get into depressions and clean flat surfaces, but it is also very flexible, because of its cloth-like nature. This fexibility is due to the unique structure of this invention, and permits the fabric to contour to many shapes, thus allowing it to clean areas or places not reachable by prior art devices. Although the preferred embodiment describes the foam to predominately exit only one side of the fabric, the foam may be placed in a web in such a manner as to exit both sides of the fabric, thus producing bristles on both sides of the fabric. This arrangement would also be useful, depending on the requirements of a product.

Once the web and foam have been assembled together in a composite structure, the resultant structure is then entangled by passing it under jets of water, which are under high pressure, thus bonding the composite together. The pressure of the water may vary between 300 to 2500 pounds per square inch (psi). The jets of water, while entangling the web and foam into an integral composite fabric, also forces the fibers in the web to be more or less compacted down into the foam structure with a part of the foam extending above the surface of the web to eventually act as bristles. This is illustrated in FIGS. 4 and 5 of the nonwoven web. In addition, because the fabric is a composite with the fibers of the nonwoven web being entangled with the foam and compacted down within the foam, the fabric becomes strong enough to take the abuse of cleaning forces without abrading. Additionally, the fabric may be produced with any selected fibers or blends, such as cotton, rayon, polyester, nylon, etc. that will give sufficient strength to the fabric to substantially resist abrading when being used as a cleaning fabric.

Chemical or thermal bonding may also produce a useful composite but would yield a structure that would not be as flexible as the fabric entangled and bonded by jets of water.

After the bonding process, which initially breaks up the foam structure into a discontinuos foam, and prior to drying the foam/web combination the fabric may be pressed between two rolls. These rolls are usually under a nip pressure of 40 psi. The rolls may be of steel, wood, a composition of materials, or any combination thereof. By passing the fabric between the rolls, the discontinuos aspect of the foam structure is further enhanced because the rolls also contribute to the break up of the foam, thereby creating bristles which would then protrude through the fabric.

To provide a better understanding of the present invention an example is presented. This example is not intended to limit this invention to other than the attached claims.

EXAMPLE 1

In this example, a continuous reticulated stiff low density foam produced by Scott Paper's Foam Division of Chester, Pa., known as Scott Industrial Foam, weighing 73 grams per square yard, being one foot of one inch in thickness ($\frac{1}{4}''$), and having a density of 1.75 pounds per foot, was placed between four (4) layers of non-woven webs produced by carding machines which were moving at a process line speed of 45 feet per minute. Two (2) layers of web were positioned on each side of the foam. Each web weighed 11 grams per square yard, for a total web weight of 44 grams per square yard. These webs were of a blend of 50% rayon and 50% polyester fibers. The composite fabric of webs and foam was then entangled together to become an integral structure. The entangling process is a two (2) step process whereby the composite is first placed on a flat 100 mesh screen, moving at the same line speed. The screen carries the web underneath two (2) water manifolds. These manifolds are pressurized at constant pressures of 500 pounds per square inch (psi) and 700 psi respectively. Each manifold has a series of orifices therein through which jets of water, at the respective manifolds high pressure, pass to entangle the fibrous web and foam together. The composite continues to the next step where it is passed over a drum screen. The drum screen carries the composite underneath three (3) water manifolds each pressurized at 1200 psi. These manifolds, like the earlier mentioned manifolds, have a series of orifices through which jets of water, at the manifold's high pressure, pass to further enhance the entangling of the web and foam. The high pressure water emmitted through the orifices tends to compact the fibers in the webs into the foam structure thus leaving part of the foam structure above the surface of the fabric. At this point the force of the water jets has substantially broken up the outer circles of polymer in the foam to create a discontinuous foam structure in which there are unconnected ends. Many of these unconnected ends of foam penetrate through the nonwoven web. The fabric is then passed between two (2) steel rolls, under a pressure of 40 psi, which further breaks up the outer circles of polymer in the foam, making a discontinous foam structure. Due to the entangling process and the passing of the fabric between steel rolls the foam structure is broken and made discontinuous. The discontinuous unconnected ends of foam that are created, are the bristles which protrude through and out of the plane of the fabric. The fabric is then dried at 300 degrees Farenheit. The finished fabric weight was 118 grams per square yard.

What is claimed is:

1. A composite wipe fabric comprising: a reticulated foam sheet material disposed in a surface-to-surface relation to at least one layer of a nonwoven web, said foam material and said web being hydroentangled together so as to cause portions of said foam to penetrate said web as bristles protruding therefrom.

2. The fabric of claim 1 wherein said reticulated foam is a stiff low density polymeric foam.

3. The fabric of claim 1 wherein said reticulated foam shall have least 70% void volume.

4. The fabric of claim 1 wherein said reticulated foam may have a density of between 1.50 to 3.0 pounds per foot.

5. A method of making a composite wipe fabric, which comprises the steps of:
   (a) depositing at least one layer of a nonwoven web and a sheet of reticulated foam onto a screen in a surface-to-surface relation to each other;
   (b) passing said screen with said web and foam under high pressure water;
   (c) causing said web and said foam to become entangled and to form a bonded composite;
   (d) drying said composite; and,
   (e) collecting said composite fabric;

6. The method of making the composite wipe fabric of claim 5, which further comprises the steps of depositing said composite on a drum screen and passing said drum screen under a second set of high pressure water jets to further entangle said composite.

7. The method of claim 5 wherein said reticulated foam is a stiff low density polymeric foam.

8. The method of claim 5 wherein said reticulated foam shall have least 70% void volume.

9. The method of claim 5 wherein said reticulated foam may have a density of between 1.50 to 3.00 pounds per foot.

10. The method of claim 5 wherein said water pressure shall range between 300 to 2500 pounds per square inch.

11. The method of claim 6 wherein said water pressure shall range between 300 to 2500 pounds per square inch.

* * * * *